United States Patent [19]

Vine et al.

[11] 3,878,296

[45] Apr. 15, 1975

[54] REACTION OF LITHIUM CARBONATE AND FIBROUS ALUMINUM OXIDE TO PRODUCE LITHIUM ALUMINATE

[75] Inventors: Raymond W. Vine, Bolton; William J. Harrison, Rockville; Roger C. Emanuelson, Glastonbury, all of Conn.

[73] Assignee: United Aircraft Corporation, East Hartford, Conn.

[22] Filed: Aug. 18, 1971

[21] Appl. No.: 172,658

[52] U.S. Cl. .................... 423/600; 136/153
[51] Int. Cl. .................... C01f 7/04; H01m 11/00
[58] Field of Search ............ 136/86 F, 153; 23/52; 29/191.2, 191.6; 106/65; 423/600

[56] References Cited
UNITED STATES PATENTS

| | | | |
|---|---|---|---|
| 2,474,440 | 6/1949 | Smith et al. | 423/600 X |
| 2,691,738 | 10/1954 | Matthias | 136/153 UX |
| 3,257,239 | 6/1966 | Schulz, Jr. et al. | 136/86 E |
| 3,266,940 | 8/1966 | Caesar | 136/153 X |
| 3,271,173 | 9/1966 | Lockhart et al. | 23/52 X |
| 3,352,650 | 11/1967 | Goldstein et al. | 29/191.2 X |
| 3,492,119 | 1/1970 | Rosenberg | 29/191.2 UX |
| 3,514,336 | 5/1970 | Giner et al. | 136/153 X |
| 3,547,180 | 12/1970 | Cochran et al. | 29/191.2 X |
| 3,607,436 | 9/1971 | Charles et al. | 106/65 X |
| 3,622,394 | 11/1971 | Bawa et al. | 136/153 |
| 3,625,773 | 12/1971 | Charles et al. | 106/65 X |
| 3,658,469 | 4/1972 | Kelsey | 106/65 X |
| 3,663,295 | 5/1972 | Baker | 136/153 X |
| 3,705,223 | 12/1972 | Pearson et al. | 106/65 X |

*Primary Examiner*—Allen B. Curtis
*Attorney, Agent, or Firm*—Stephen E. Revis

[57] ABSTRACT

An electrolyte matrix comprising fibrous lithium aluminate for use in an electrochemical cell comprising an alkali or alkaline earth carbonate electrolyte is described. The matrix has good thermal cycle characteristics from ambient to the operating temperature of the cell, and good electrolyte retention and wicking properties.

1 Claim, 1 Drawing Figure

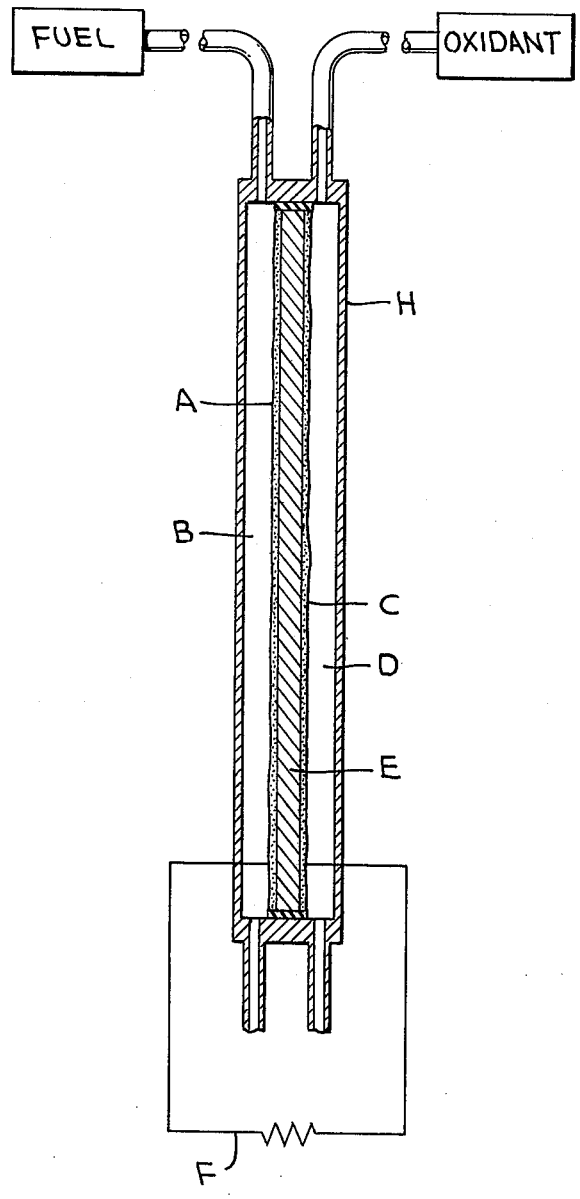

REACTION OF LITHIUM CARBONATE AND FIBROUS ALUMINUM OXIDE TO PRODUCE LITHIUM ALUMINATE

FIELD OF INVENTION AND BACKGROUND

This invention relates to electrochemical cells of the type comprising an ion-conducting molten carbonate electrolyte in contact with an anode and cathode. More particularly, the invention is directed to improved electrolyte matrices comprising fibrous lithium aluminate which support or retain an alkali or alkaline earth carbonate electrolyte in an electrochemical cell. "Matrix" or "matrices" as the terms are employed herein include structures in which a molten carbonate is retained by capillary action, as well as solid electrolyte tiles or blocks where the ion-conductive electrolyte material is dispersed with and pressed with a non-electrolyte material to form the matrix. Further, for purposes of convenience, this invention will be described in reference to fuel cells comprising an anode, a cathode, and an electrolyte for the direct generation of electrical energy from a fuel and oxidant. It is to be understood, however, that the matrix can be employed in other electrochemical cells where similar considerations apply.

Fuel cells are known which utilize ceramic or refractory materials in the fabrication of matrices for impregnation with an aqueous electrolyte, and which utilize electrolyte matrices (tiles or blocks) formed from mixtures of a carbonate of the alkali or alkaline earth metals; or other electrolyte material, with a finely powdered refractory material which is inert to the carbonates such as magnesium oxide, aluminum oxide, zirconium oxide, and the like. Moreover, the use of fibrous refractory materials in place of powders has been suggested to increase structural integrity of the matrices.

Although there are recognized advantages in cells utilizing the aforesaid matrices impregnated with electrolyte material, including increased conductivity in comparison to solid electrolyte cells and improved control of the three-phase reaction interface of electrolyte, electrode, and reactant in the case of free-flowing aqueous electrolytes, such structures have shortcomings as a result of cracking of the matrices during thermal cycling, i.e., heating from room or ambient temperature to operating temperature and again cooling to room temperature, etc.; powdering of the cell matrix from prolonged contact with molten carbonate electrolyte; low bubble pressure of the structure when hot pressed at a temperature and pressure sufficient to provide the requisite structural strength, etc.

OBJECTS AND GENERAL DESCRIPTION

Accordingly, it is an object of the present invention to provide an electrolyte matrix for use in an electrochemical cell comprising fibrous lithium aluminate which is highly resistant to a corrosive electrolyte; has good thermal cycle characteristics; has good electrolyte retention and wicking properties, and good structural integrity.

It is another object of this invention to provide an electrochemical cell comprising an anode, cathode, and a solid or molten electrolyte in structural combination with a fibrous lithium aluminate matrix, permitting continuous thermal cycling of the cell without cracking of the matrix.

It is another object of this invention to provide a method of making fibrous lithium aluminate which is highly resistant to corrosive electrolytes and which is capable of adding structural integrity to a porous electrolyte matrix when utilized in combination with materials having relatively low structural strength and integrity.

It is another object of this invention to provide a method of making an electrolyte matrix comprising fibrous lithium aluminate which has good thermal cycling characteristics, good wicking and electrolyte retention properties, and high bubble pressure.

It is another object of this invention to provide a method of making an electrolyte tile or block comprising a solid electrolyte material, such as an alkali or alkaline earth carbonate and fibrous lithium aluminate whereby the electrolyte matrix has good thermal cycle characteristics, permitting prolonged operation in a fuel cell without undergoing degradation such as powdering of the matrix or the like.

These and other objects of the invention will be more fully apparent from the following detailed description, with emphasis being placed on the working embodiments and drawing.

Briefly, the objects of this invention are accomplished by utilizing fibrous lithium aluminate to fabricate an electrolyte matrix structure which has a high degree of structural integrity permitting continuous thermal cycling without cracking and prolonged contact with corrosive electrolytic materials. Furthermore, the matrices have good electrolyte retention and wicking properties and can be fabricated to have high gas bubble pressures. Although the fibrous lithium aluminate can be used alone as the refractory matrix material, the fibrous lithium aluminate is preferably employed in admixture or in combination with lithium aluminate powder which provides improved capillarity of the structure and, thus, better electrolyte retention and wicking characteristics. Furthermore, the fibrous lithium aluminate can be employed in admixture with other refractory powders such as magnesium oxide, aluminum oxide, thorium oxide, zirconium oxide, or the like.

The lithium aluminate fibers can be readily prepared by heating a uniform admixture of gamma aluminum oxide fibers and lithium carbonate powder. The aluminum oxide fibers are readily obtained by breaking and screening aluminum oxide felt or aluminum oxide tow. Aluminum oxide tow is preferable over aluminum oxide felt for some applications in that the tow has long strands and, accordingly, permits good control of the fiber lengths. It is essential that the materials are thoroughly mixed to ensure intimate contact of the aluminum oxide fibers and lithium carbonate powders. The heating, preferably in the temperature range of from about 1,300° to 1,400°F., is for a time sufficient to ensure a complete conversion of the aluminum oxide fibers to gamma lithium aluminate. Normally from 10 to 16 hours is adequate. It is to be understood, however, that in this reaction as with other chemical reactions time and temperature are interrelated. Accordingly, if the temperature is increased, the reaction time can be shortened. The ratio of aluminum oxide fibers to lithium carbonate can be from 1:3 to 3:1 and preferably is 1.38:1 on a weight basis. If less than appoximately stoichiometric amounts of lithium carbonate are employed, the complete conversion of the aluminum oxide fibers to lithium aluminate is not realized. Although incompletely converted fibers are useful in fabricating an electrolyte matrix, complete conversion is normally preferred. The resultant lithium aluminate fibers will have various crystal forms, such as a gamma tetragonal form, or the like. The lithium aluminate fibers may contain minor impurities such as copper, iron, silica, magnesium, sodium, titanium, and the like. These impurities are not harmful to the electrolyte matrix.

Various processes can be used in fabricating the fibrous lithium aluminate into an electrolyte matrix. Preferably, however, in the construction of an electrolyte matrix or tile containing an alkali or alkaline earth carbonate, i.e., sodium, lithium, calcium, potassium, rubidium, strontium, barium, or cesium carbonate; the lithium aluminate fibers and alkali or alkaline earth carbonate are mixed in a jar mill to obtain thorough mixing. Thereafter the mix is hot-pressed to give the desired thickness and density. Normally, ratios of non-electrolyte material, i.e., fibrous lithium aluminate alone or in admixture with refractory powders, will be from about 25 to 40 volume percent. If the percentage of non-electrolyte material exceeds about 50 volume percent, low cell performance will be realized. The lithium aluminate fibers can range from about 100 percent of the entire non-electrolyte content down to as low as about 40 volume percent. Below about 40 volume percent the improved thermal cycling is not realized.

In manufacturing the matrices, the temperature and pressure can vary substantially depending upon the thickness and porosity desired in the matrix. Normally, however, the structures will be heated at a temperature of from about 500° to 1,000°F., while hot pressing at a pressure of from 8,000 to 16,000 pounds per square inch. Optimum temperatures are from about 500° to 750°F. The matrices can have varying thicknesses. Matrices having a thickness as low as about 10 to 15 mils can be fabricated which have good structural strength and will undergo repeated thermal cycling without cracking. Normally, however, the matrices will have thicknesses of from about 25 to 30 mils. Although thicker structures can be prepared, i.e., 100 mils and above, the internal resistances (IR drop) across the matrices is increased, lowering cell performance. The matrices can be made in any shape or size, i.e., square, round, oblong or the like.

In the event the matrices are to be utilized with an aqueous or molten electrolyte, the procedure of fabrication is similar to that developed above. However, rather than employing the alkali or alkaline earth carbonate, materials such as ammonium carbonate and starch which are consumed at low temperatures are utilized. During the heating step or at a later step the aforesaid additives are removed to provide a porous structure. The porosity will be determined by the amount of filler employed during the fabrication, with the pore size being determined in large part by the pressure applied in the manufacturing process and by the particle size of the filler. Preferably, the matrices to be utilized with an aqueous electrolyte will have porosities of from about 50 to 80 percent. The electrolyte is retained in the pores by the capillary attraction of the fibrous lithium aluminate.

The matrices developed in accordance with this invention are particularly desirable in view of their thermal cycling characteristics as well as integrity after prolonged use in a fuel cell in contact with a corrosive electrolyte. Moreover, utilizing the fibrous lithium aluminate according to the present invention, bubble pressures of up to three pounds per square inch and above are obtainable. These high bubble pressures permit cell operation with higher reactant gas pressures and pressure differentials providing greatly increased electrochemical performance.

Fuel cells utilizing the electrolyte matrices of the present invention can be constructed employing any of the prior art electrodes which will withstand operating conditions of the cell. These include rigid pre-formed electrodes such as porous nickel or lithiated nickel structures; plates or disks of palladium/gold alloys; doped carbon bodies; or electrodes which are applied directly to the electrolyte disk by spraying or rolling a layer of catalytic material onto the opposite faces of the electrolyte matrix. These electrodes will normally comprise a catalytic material such as the pure elements, alloys, oxides, or mixtures thereof belonging to Groups IB, IIB, IV, V, VI, VII, and VIII of the Periodic Table and the rare earth elements. The Groups IB and VIII metals are preferred.

Any of the carbonaceous fuels containing hydrogen or hydrogen can be used as the fuel in the fuel cell of the present invention. The most advantageous fuels from the standpoint of economy are the saturated and unsaturated hydrocarbons particularly the saturated hydrocarbons, i.e., the alkanes. The preferred alkanes contain from 1 to 16 carbon atoms which can be straight or branch chained or cyclic molecules or mixtures thereof. Further, any of the known oxidizing agents can be employed at the cathode of the fuel cells of the invention. The preferred oxidants are air and oxygen.

PREFERRED EMBODIMENT AND DRAWING

Having described the invention in general terms, specific and preferred embodiments will be set forth to more particularly emphasize the invention with reference to the Drawing.

EXAMPLE 1

Lithium aluminate fibers are produced by reacting a mixture containing stoichiometric amounts of lithium carbonate powder and gamma aluminum oxide fibers obtained by breaking and screening aluminum oxide felt. The mixture of gamma aluminum oxide and lithium carbonate powder was blended for ten minutes in a jar mill to ensure uniform contact throughout. Thereafter, the mixture was heated at a temperature of 1,300°F. for 14 to 16 hours. The resultant fibers were shown by X-ray diffraction to be lithium aluminate fibers having a gamma tetragonal form. Spectral chemical analysis indicated that the lithium aluminate contained minor impurities including 2 percent titanium, 0.01 percent copper, 0.02 percent iron, 0.04 percent silica, 0.01 percent magnesium, and 0.2 percent sodium.

31 weight percent of the lithium aluminate fibers obtained above were admixed with 69 weight percent of a mixture of sodium, potassium and lithium carbonate in a jar mill. The thoroughly blended mix was heated to 570°F. and, while hot, pressed in a round 6.6 inch diameter mold to obtain a thickness of 0.1 inch.

EXAMPLE 2

Fifty weight percent lithium aluminate fibers as prepared in Example 1 were thoroughly mixed for 10 minutes in a jar mill with 50 weight percent lithium aluminate powder. After being thoroughly blended, 31 weight percent of the mixture of lithium aluminate fibers and powder were admixed with 69 weight percent of a mixture of sodium, potassium, and lithium carbonate and blended for 10 minutes in a jar mill. Thereafter the thoroughly blended mixture was pressed at a temperature of 650°F., to a thickness of 0.1 inch.

EXAMPLE 3

Example 2 was repeated except in this instance the lithium aluminate powder was replaced with powdered zirconium oxide. The fabrication temperature was 780°F., to obtain a structure 0.1 inch in thickness.

Each of the structures prepared in Examples 1–3 were utilized in a fuel cell as defined in the drawing. Thus, the cell was constructed comprising a housing H made of any suitable material such as stainless steel, an electrolyte disk E as defined in Examples 1–3, an anode A and a cathode C in contact with opposite surfaces of the electrolyte disk. The electrodes A and C were disks of palladium/gold alloys intimately contacted with the electrolyte matrix. Air as the oxidant is fed to the cathode from an oxidant supply to chamber D where it contacts the cathode C. Hydrogen from a fuel storage tank is fed to chamber B where it contacts anode A. Excess oxidant and fuel are exhausted from the cell and electrical energy removed through circuit F.

The electrolyte matrices prepared in Examples 1–3 permitted continuous thermal cycling from ambient conditions to the operating conditions of the cell, i.e., 1,300°F., without damaging of the matrix, permitting prolonged operation without matrix deterioration.

As will be apparent to one skilled in the art, various modifications can be made in the electrolyte matrices of the present invention and in the fuel cell utilizing the novel electrolyte matrix without departing from the scope of this invention. Thus, it is possible to utilize various refractory materials in combination with the fibrous lithium aluminate and, furthermore, it is possible to utilize the matrix in combination with an aqueous electrolyte rather than with the molten carbonate electrolyte. Further, various electrodes can be employed in the fabrication of the electrochemical cell. Such modifications and departures are to be covered herein with the invention only being limited in accordance with the appended claims.

It is claimed:

1. The method of producing fibrous lithium aluminate comprising the steps of providing a uniform admixture of lithium carbonate and aluminum oxide fibers and heating said mixture at a temperature sufficient to convert the aluminum oxide to lithium aluminate, the ratio of aluminum oxide fibers to lithium carbonate being from 1 : 3 to 3 : 1.

* * * * *